(12) United States Patent
Johnson et al.

(10) Patent No.: US 6,679,772 B2
(45) Date of Patent: Jan. 20, 2004

(54) FOLDABLE GRAIN TANK EXTENSION FOR AN AGRICULTURAL HARVESTING MACHINE

(75) Inventors: Orlin W. Johnson, Geneseo, IL (US); Prasenjit Adhikari, Downers Grove, IL (US); Lavern Weinschenk, Jr., Princeton, IA (US); Gary C. Polk, Lake Zurich, IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 10/173,502

(22) Filed: Jun. 17, 2002

(65) Prior Publication Data

US 2003/0232634 A1 Dec. 18, 2003

(51) Int. Cl.$^7$ .......................... A01D 90/10; A01F 12/60
(52) U.S. Cl. ..................... 460/23; 460/119; 414/502
(58) Field of Search ..................... 460/23, 119, 901, 460/902, 903; 414/502, 505; 56/28, DIG. 9; 111/24, 63, 74, 75, 925, 200

(56) References Cited

U.S. PATENT DOCUMENTS

| | | | |
|---|---|---|---|
| 2,768,022 A | | 10/1956 | Pope ........................... 296/27 |
| 3,215,291 A | * | 11/1965 | Nickla ...................... 414/525.1 |
| 3,319,684 A | | 5/1967 | Calhoun ........................ 150/8 |
| 4,106,649 A | * | 8/1978 | Nelson et al. ............... 414/505 |
| 4,519,189 A | | 5/1985 | Fachini et al. ............... 56/16.6 |
| 4,960,300 A | * | 10/1990 | Burvee ......................... 296/34 |
| 5,151,064 A | * | 9/1992 | Damman et al. ............. 460/23 |
| 5,427,572 A | | 6/1995 | Deutsch et al. ............. 460/119 |
| 6,074,298 A | * | 6/2000 | Majkrzak et al. ........... 460/119 |
| 6,126,220 A | | 10/2000 | Brasher ................... 296/26.04 |
| 6,206,779 B1 | * | 3/2001 | Gerber et al. ................. 460/23 |
| 6,508,705 B1 | * | 1/2003 | Van Overschelde .......... 460/23 |

* cited by examiner

Primary Examiner—Árpád Fábián Kovács
(74) Attorney, Agent, or Firm—John William Stader; Collin A. Webb (57) ABSTRACT

A foldable extension for increasing a grain holding capacity of a grain tank of an agricultural harvesting machine. The grain tank includes angularly related upper peripheral portions defining an upwardly facing opening, and the extension includes a corresponding number of extension panels mounted for pivotal movement about the respective upper peripheral portions of the grain tank. Each of the extension panels is pivotally positionable in a deployed position extending upwardly and outwardly relative to the opening of the grain tank at an acute angle of less than about 80° to horizontal, and a generally horizontal folded position extending over a portion of the opening, adjacent ones of the extension panels having adjacent ends defining corner spaces therebetween when in the deployed position. The extension additionally includes foldable corner panels connected between the adjacent ends of the adjacent ones of the extension panels, respectively, each of the corner panels including hinge joints hingedly connecting the corner panel to the adjacent ends and additional hinge joints dividing the corner panel into sections hingedly movable in predetermined directions between predetermined positions about the hinge joints, such that when the extension panels are in the deployed position the sections will be located in a generally side-by-side predetermined relation extending upwardly and outwardly from the opening of the grain tank, and such that when the extension panels are in the folded position the sections will be at least generally horizontal and in overlaying relation one relative to another.

13 Claims, 5 Drawing Sheets

FOLDABLE GRAIN TANK EXTENSION FOR AN AGRICULTURAL HARVESTING MACHINE

TECHNICAL FIELD

This invention relates generally to an extension for a grain tank of an agricultural harvesting machine such as a combine, and more particularly, to a grain tank extension which is adapted to be automatically and/or remotely unfolded and folded in a predetermined manner between a folded or closed position wherein extension panels thereof are at least generally horizontal, and a deployed or unfolded position wherein the panels extend upwardly and outwardly relative to an upwardly facing opening of the grain tank at an acute angle to horizontal, thereby increasing both the vertical and horizontal extents thereof.

BACKGROUND ART

Currently, when it is desired to increase the capacity of the grain tank of an agricultural harvesting machine such as a combine, a rigid walled structure is typically affixed around an upwardly facing opening of the grain tank so as to extend upwardly therefrom. Such known extensions provide satisfactory grain capacity increasing utility. However, observed shortcomings include that they correspondingly increase the overall height of the machine, such that removal may be required to meet government imposed height limitations for road travel. Such rigid structures themselves also provide no covering protection for the grain tank and its contents.

It is also known to provide an extendible cover for the upwardly facing opening of a grain tank, which cover is automatically movable directly upwardly from the periphery of the opening along at least two sides of the grain tank so as to expand the capacity thereof. However, since at least two sides of such known devices extend only directly upwardly and not outwardly from the upward opening, the increased grain holding capacity is limited.

Therefore, what is sought is a foldable extension for a grain tank of an agricultural harvesting machine which facilitates automatic and/or remote operation thereof and provides orderly unfolding and folding between a generally horizontal, flat folded or closed position, and a deployed or unfolded position wherein extension panels thereof are oriented so as to extend both upwardly and outwardly from the upwardly facing opening of the grain tank to thereby increase both the vertical extent thereof and the horizontal extent thereof.

SUMMARY OF THE INVENTION

According to a preferred aspect of the present invention, a foldable extension for increasing a grain holding capacity of a grain tank of an agricultural harvesting machine is disclosed, the grain tank including angularly related upper peripheral portions defining an upwardly facing opening, and the extension including a corresponding number of extension panels mounted for pivotal movement about the respective upper peripheral portions of the grain tank. Each of the extension panels is pivotally positionable in a deployed position extending upwardly and outwardly relative to the opening of the grain tank at an acute angle of less than about 80° to horizontal, and a generally horizontal folded position extending over a portion of the opening, adjacent ones of the extension panels having adjacent ends defining corner spaces therebetween when in the deployed position. The extension additionally includes foldable corner panels connected between the adjacent ends of the adjacent ones of the extension panels, respectively, each of the corner panels including hinge joints hingedly connecting the corner panel to the adjacent ends and additional hinge joints dividing the corner panel into sections hingedly movable in predetermined directions between predetermined positions about the hinge joints, such that when the extension panels are in the deployed position the sections will be located in a generally side-by-side predetermined relation extending upwardly and outwardly from the opening of the grain tank, and such that when the extension panels are in the folded position the sections will be at least generally horizontal and in overlaying relation one relative to another.

According to one preferred embodiment of the invention, the corner panels are each configured and foldable so as to be located between the ends of the extension panels when in the folded or closed position. In another preferred embodiment, the corner panels are configured and foldable to overlay the ends of the extension panels when in the folded or closed position.

DETAILED DESCRIPTION OF THE INVENTION

Figure 1:
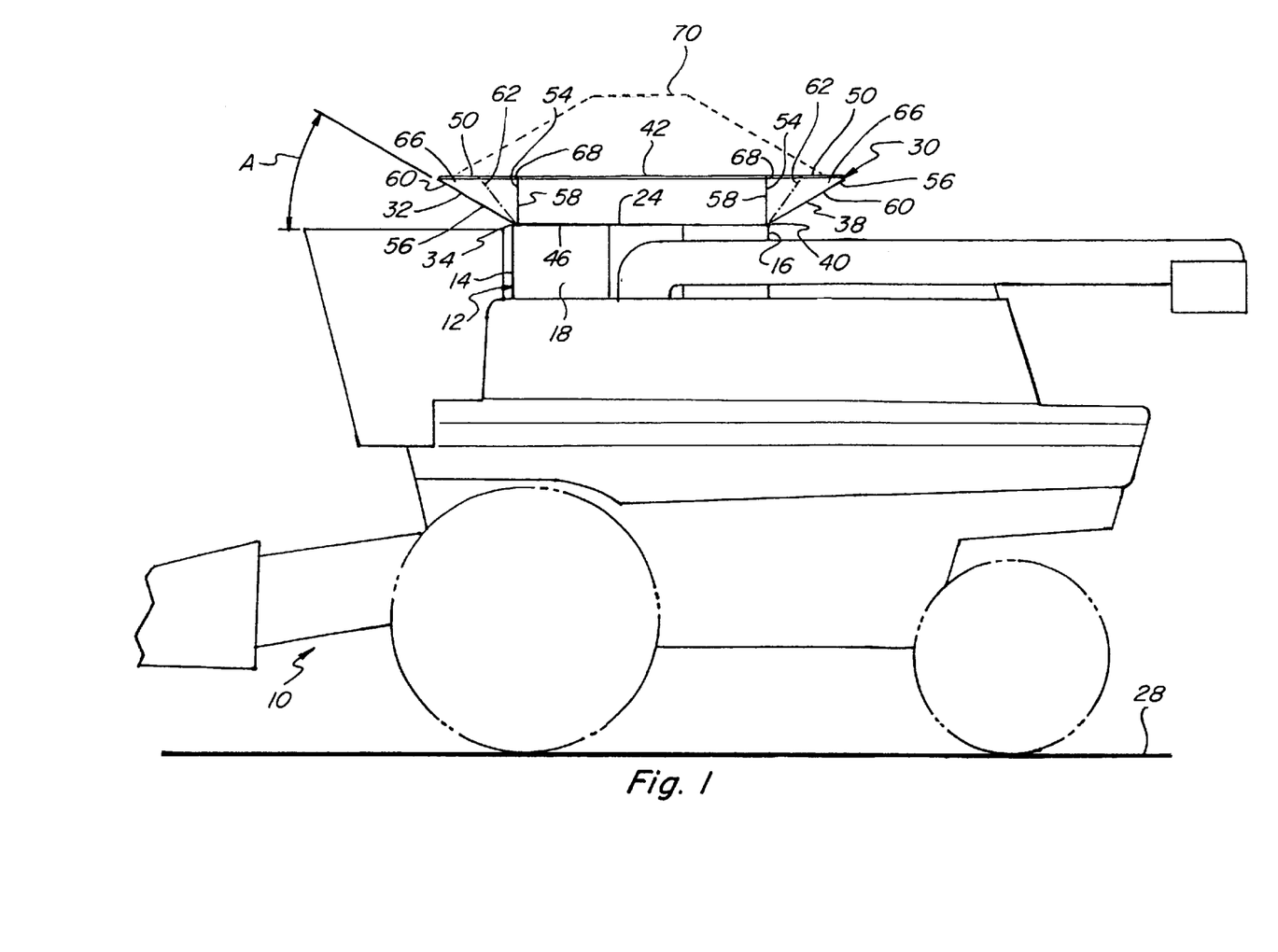
FIG. 1 is a simplified side view of a representative harvesting machine including a grain tank having a foldable extension according to the present invention shown in a deployed or unfolded position supporting a quantity of grain (dotted lines)
Figure 2:
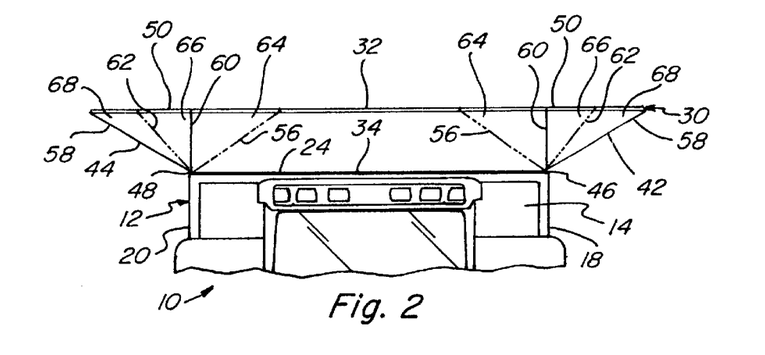
FIG. 2 is a simplified fragmentary front view of the harvesting machine of FIG. 1 showing the foldable extension in the deployed position.
Figure 3:
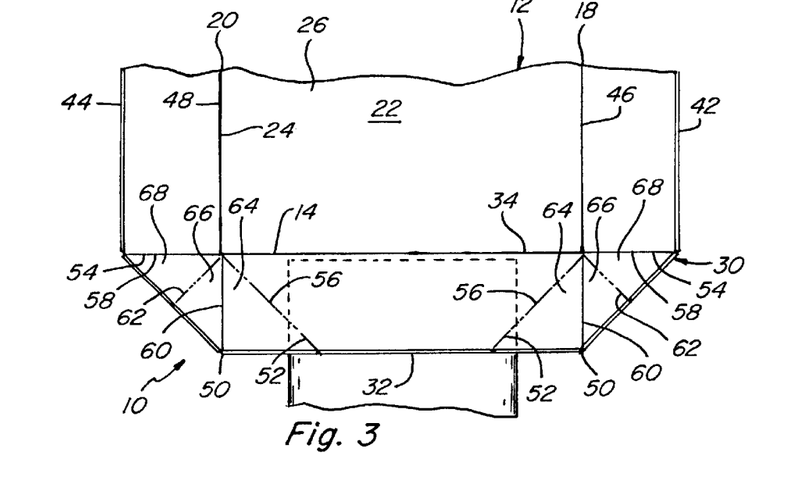
FIG. 3 is a simplified fragmentary top view of the harvesting machine and foldable extension of FIG. 1.

Referring now to the drawings, wherein several preferred embodiments of the invention are shown, in FIGS. 1 and 2, a representative harvesting machine 10 is shown which is a self-propelled combine including apparatus for harvesting, cleaning and conveying clean grain, such as, but not limited to, corn, wheat, or soybeans, to a grain tank 12, located atop machine 10. Grain tank 12 includes a plurality of upstanding, angularly related walls, including a forward wall 14, a rear wall 16 opposite forward wall 14, and opposed side walls 18 and 20 (FIG. 2) extending between forward and rear walls 14 and 16. Referring also to FIG. 3, walls 14, 16, 18, and 20 define a rectangular shaped receptacle 22 for receiving and holding grain harvested by machine 10. Walls 14, 16, 18, and 20 additionally include a substantially continuous, rectangular upper edge 24 defining an upper end of receptacle 22 and an upwardly facing rectangular opening 26 corresponding at least generally in horizontal extent to receptacle 22. Upper edge 24 typically represents the highest or one of the highest locations on a combine such as harvesting machine 10 relative to a surface 28 such as the ground or a road surface on which machine 10 is located. This height will typically have a maximum value as dictated by a governmental entity for safe passage on public roads, under bridges and/or utility wires. However, such a maximum height is a disadvantage as it limits the grain holding capacity of grain tank 12. As a result, a problem that can arise, particularly when harvesting in very large fields, is that grain tank 12 may fill to its capacity before a section of a crop field being harvested is complete, or when machine 10 is at a location within a field far from a grain truck or wagon into which the grain is to be unloaded, such that the harvesting operation is interrupted for a longer than desired time, as required to drive machine 10 to the unloading location, unload it, and return it to the harvesting location. If a rigid, fixed extension is placed about upper edge 24 to expand the capacity of a grain tank such as tank 12 in the known manner, if the extension exceeds the maximum lawful height, it must be removed for legal passage over public roads. Such an extension may also be damaged by contact with low hanging tree limbs, or may damage the limbs themselves.

Figure 9:
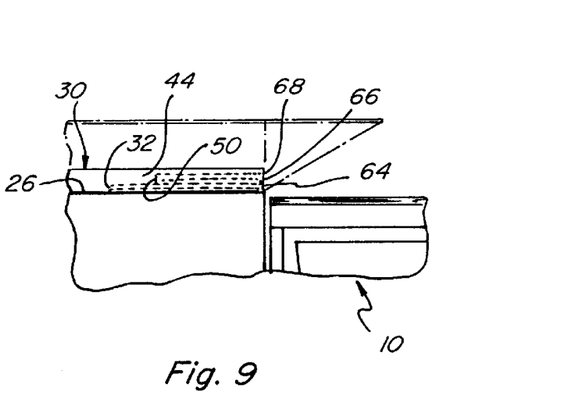
FIG. 9 is a simplified fragmentary side view of the machine of FIG. 1 showing the extension in the folded position in solid lines, and in the deployed or unfolded position in phantom.
Figure 10:
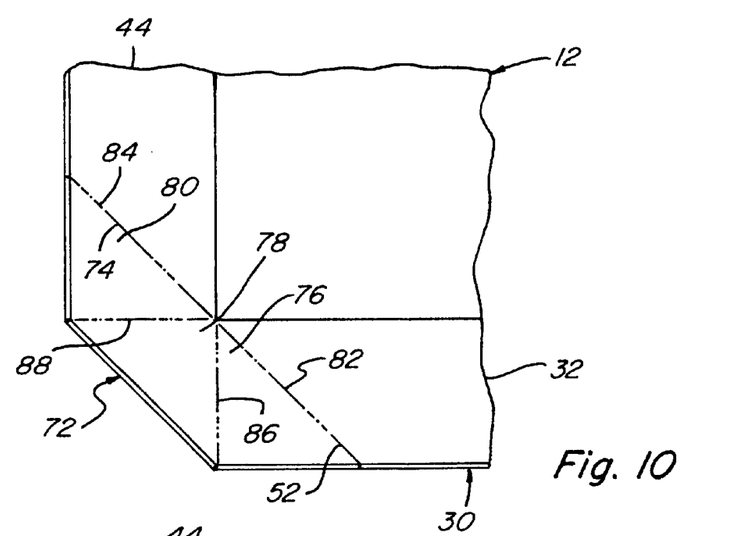
FIG. 10 is a simplified fragmentary top view of another foldable extension according to the invention shown in a deployed or unfolded position on a representative grain tank.

To avoid the above-discussed problems, grain tank 12 of harvesting machine 10 includes a foldable extension 30 constructed and operable according to the teachings of the present invention. Extension 30 is foldable between a deployed or unfolded position (FIGS. 1, 2 and 3) extending upwardly and outwardly from grain tank 12 for substantially increasing the grain holding capacity thereof, and a folded or closed or stored position (FIG. 9) which is at least generally horizontal or generally lying in a plane of opening 26 in partial covering relation to opening 26 so as to be more easily capable of meeting overall height requirements of machine 10 for travel over public roads and the like. Foldable extension 30 includes a forward extension panel 32 preferably of substantially rigid material such as sheet metal, plastics or another suitable material for the present application. Panel 32 has a generally horizontal lower edge portion pivotally connected to that portion of upper edge 24 extending along forward wall 14 by a pivot joint 34. Pivot joint 34 can be any suitable hinge or hinge type device, such as a plastics living hinge, a piano hinge, multiple hinges, or other suitable hinging or pivoting elements, for allowing pivotal movement of panel 32 between a deployed position (FIGS. 1, 2, and 3) oriented at acute angle to horizontal, denoted by angle A in FIG. 1, of about 80° or less, and an at least generally horizontal folded or closed or stored position in partial covering relation to opening 26, as shown in FIG. 9. Foldable extension 30 includes a rear extension panel 38 located opposite forward panel 32, rear panel 38 preferably likewise being constructed of a substantially rigid materials such as a metal or plastics, and having a lower edge pivotally connected to rear wall 16 along upper edge 24 by a pivot joint 40, for pivotal movement between the deployed or unfolded position (FIG. 1) oriented at an acute angle of less than about 80° relative to horizontal, and the folded or closed position at least generally horizontal and in partial covering relation to opening 26. A pair of side extension panels 42 and 44 also preferably constructed of a substantially rigid sheet metal or plastics material are located between panels 32 and 38 along opposite sides of grain tank 12, above side walls 18 and 20, respectively. Panels 42 and 44 are pivotally connected to those portions of upper edge 24 extending along walls 18 and 20 by pivot joints 46 and 48, respectively, which, again, can preferably include plastics living hinges or mechanical hinges such as a piano hinge or a plurality of individual hinges spaced along edge 24, and allow pivotal movement of panels 42 and 44 between a deployed or unfolded position oriented at an acute angle of less than about 80° to horizontal, and a folded or closed position at least generally horizontal and in partial covering relation to opening 26.

Foldable extension 30 importantly includes a plurality of foldable corner panels 50, which extend between and enclose, respectively, gaps located between spaced opposed ends 52 and 54 of adjacent panels 32, 38, 42, and 44. Each foldable corner panel includes a first hinge joint 56 hingedly or pivotally connecting it to an end 52 of an adjacent forward or rear extension panel 32 or 38; a second hinge joint 58 hingedly or pivotally connecting it to an end 54 of an adjacent side extension panel 42 or 44; and at least a third hinge joint 60 and a fourth hinge joint 62 located between first and second hinge joints 56 and 58, dividing the corner panel 50 into a plurality of sections, including a first section 64; a second section 66; and a third section 68. Ends 52 of forward and rear extension panels 32 and 38 each form an acute angle with the axis of pivotal movement of the panel relative to grain tank 12, ends 54 form about a 90° angle to the pivotal axis, and hinge joints 56, 58, 60 and 62 have predetermined locations, orientations, and directions of hinged or pivotal movement, such that sections 64, 66, and 68 are foldable and unfoldable in predetermined directions only. As will be explained, this allows the sequential or ordered unfolding of extension 30 from the folded or closed position (FIG. 9) to the deployed or unfolded position (FIG. 1), and the refolding from the deployed position to the folded or closed position, using suitable remote control, or automatic elements, such as linear actuators, fluid cylinders or the like (not shown), without requiring an operator to manually unfold or fold any portion of extension 30.

Figure 4:
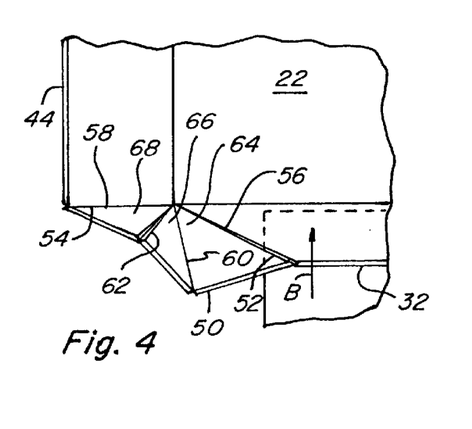
FIG. 4 is a simplified fragmentary top view of the harvesting machine showing the extension partially folded toward a folded position thereof.

Hinge joints 56, 58, 60, and 62 can each be of any suitable construction for providing the required operability, including a plastics living hinge, a piano hinge, or the like, plastics living hinges being most preferred. Sections 64, 66, and 68 are preferably constructed of a material such as a sheet metal, plastics, or the like, so as to be sufficiently rigid so as to retain their original or nearly original shape when extension 30 is in the deployed position and supporting an anticipated maximum quantity of grain, as denoted at 70 in FIG. 1, and so as to fold and unfold reliably and completely in the manner described hereinafter. As one preferred manner of manufacture, a corner panel 50 can be made from a single sheet of a plastics material which is cut or molded to include hinge joints 56, 58, 60, and 62, and can be suitably attached to panels 32, 38, 42, and 44 using, for instance, mechanical fasteners such as bolts, rivets, or the like, adhesives, or clamping. Further, hinge joints 56, 58, 60, and 62 can be formed or controlled so as to be hingedly movable in the predetermined direction only and to only a predetermined extent, in any convenient well known manner, such as by using stops or projections on the panels or sections (not shown) which are engaged when the hinge joint is moved to a certain desired maximum extent, or prevent further relative movement in a certain direction, as desired, and as required for corner panels 50 to retain their desired shape when supporting grain. As an example, referring to FIGS. 3 and 4, hinge joint 62 can optionally be formed so as not to allow sections 66 and 68 to reach a coplanar position shown in FIG. 3 when panel 32 and 44 are in the deployed position, but instead reach only a large obtuse angle, for instance, about 160–170° or about as shown in FIG. 4, even when loaded when grain, such that when pivotal movement of the extension panels to the folded position is initiated, forces acting on sections 66 and 68 will not urge hinged movement thereof in the unintended direction outwardly and downwardly. It is also contemplated that springs (not shown) could be connected between one or more of the panels and sections, so as to urge them to hingedly move in one of the predetermined direction.

Figure 5:
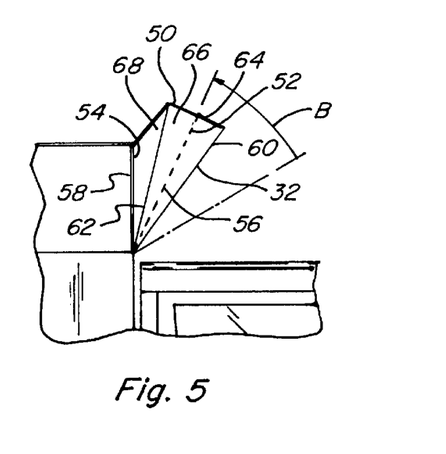
FIG. 5 is a simplified fragmentary side elevational view of the harvesting machine of FIG. 1 showing further partial folding of the extension.
Figure 6:
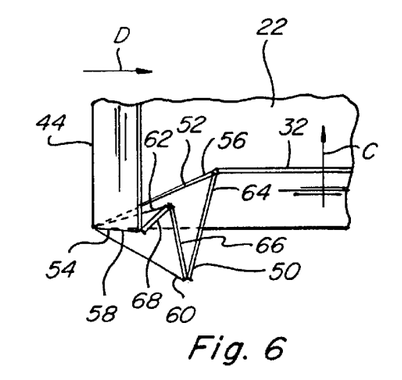
FIG. 6 is another simplified fragmentary top view of the extension of FIG. 1 in a further folded position.
Figure 7:
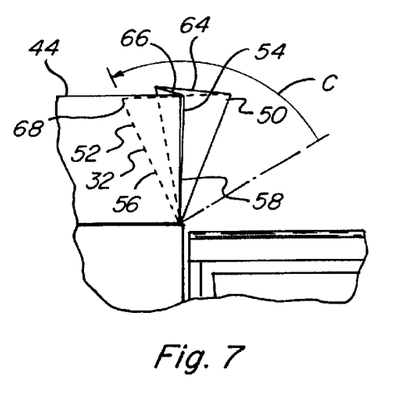
FIG. 7 is another simplified fragmentary side view of the harvesting machine of FIG. 1 showing the extension folded to about the position of FIG. 6.
Figure 8:
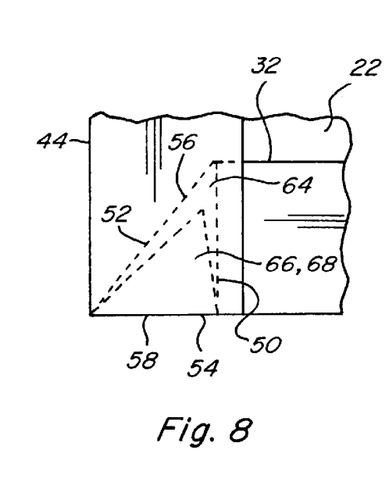
FIG. 8 is a simplified fragmentary top view of the extension of FIG. 1 shown fully folded.

FIGS. 4, 5, 6, 7, 8, and 9 illustrate one preferred manner of the sequential folding of the sections of corner panels 50 in concert with the pivotal folding of panels 32, 38, 42, and 44 from the fully deployed position (FIGS. 1, 2, and 3) to the fully folded position (FIG. 9). In FIGS. 4 and 5, it can be seen that first hinge joint 56 allows hinged or pivotal movement of forward extension panel 32 relative to first section 64 in an upward and inward (toward receptacle 22) direction, as denoted by arrows B. At the same time, hinge joints 58, 60, and 62 allow hinged or pivotal movement of sections 66 and 68 inwardly toward receptacle 22. Referring also to FIGS. 6 and 7, further pivotal movement of panel 32 toward receptacle 22, denoted by arrows C, causes greater relative hinged or pivotal movement of section 64 such that section 66 is moved or pivoted further about joint 60, and extension 68 is hingedly moved or pivoted a greater amount about pivot joints 62 and 58, such that side extension panel 44 is moved farther from its deployed position toward its folded position, as denoted by arrow D. Referring also to FIGS. 8 and 9, further pivotal movement of panel 32 to its substantially horizontal position in partial covering relation to receptacle 22 allows section 64 to fold about pivot joint 56 into substantial parallel, overlaying relation to panel 32, sections 66 and 68 following section 64 so as to be positioned in overlaying relation thereto, such that side extension panel 44 can follow section 68 to overlay panel 32 and sections 64, 66, and 68, at only a small acute angle to horizontal. Unfolding of extension 30 is in the reverse order to that just explained. That is, panel 44 is pivoted upwardly, followed by sections 68, 66, and 64, and panel 32.

Here, it should be noted that the sequence of folding and unfolding of the corner panels 50 at the other corners of extension 30 will be the same as just described. Additionally, it should be noted that an important advantage achieved by foldable extension 30 is that the folding and unfolding is orderly and reliable to facilitate remote and/or automatic operation, for instance, by connection of suitable drivers including, but not limited to, a linear actuator, a fluid cylinder, an electric or fluid motor, or the like (not shown), to forward extension panel 32, rear extension panel 38, and side panels 42 and 44, either directly or using linkages or other suitable driving connections. Unfolding can be achieved by operation of the drivers in the reverse of the direction for folding.

Referring now to FIGS. 10, 11, 12, 13, 14, and 15, foldable extension 30 is shown on grain tank 12 including a representative alternative foldable corner panel 72 constructed and operable according to the teachings of the present invention. Foldable corner panel 72 allows folding movement of the front, rear, and side panels of extension 30 between the deployed position at the preferred acute angle of less than about 80° to horizontal, and the preferred folded or closed position at least generally horizontal and in partial covering relation to the upwardly facing opening of grain tank 12. Foldable corner panel 72 is shown connected between forward extension panel 32 and side extension panel 44, and is exemplary of foldable corner panels 72 usable at the other corners. Panels 32 and 44 are pivotally connected to grain tank 12 in the above-described manner, panel 32 including the same end 52 as described and shown above, but side extension panel 44 including an end 74 which is oriented at about the same angle as end 52 (FIG. 10), instead of a more squared end 54 as utilized with foldable corner panel 50. Foldable corner panels 72 like corner panel 50 is divided into a plurality of sections, namely, three sections 76, 78, and 80, by at least four hinge joints, including a first hinge joint 82 hingedly or pivotally connecting section 76 to end 52 of forward extension panel 32; a second hinge joint 84 hingedly or pivotally connecting section 80 to end 74 of side extension panel 44; and third and fourth hinge joints 86 and 88.

Operationally, foldable corner panel 72 differs from corner panel 50 in that adjacent panels 32 and 44 should be folded simultaneously and unfolded simultaneously, and thus suitable drivers should be provided for that purpose, such as, but not limited to, those discussed above (not shown), connected to each of extension panels 32, 38, 42, and 44.

Figure 11:
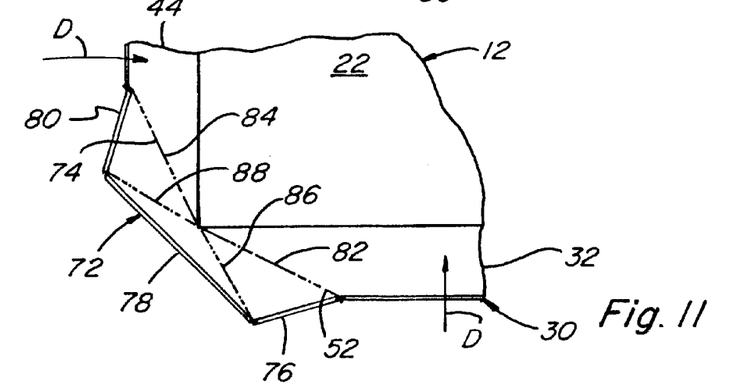
FIG. 11 is another simplified fragmentary top view of the extension and grain tank of FIG. 10, showing the extension in a partially folded position.
Figure 12:
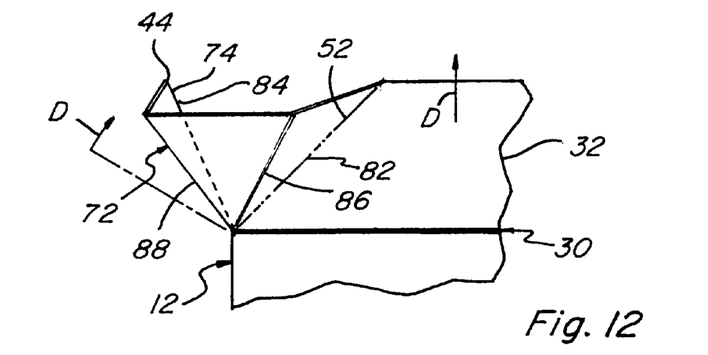
FIG. 12 is a simplified fragmentary front view of the extension and grain tank of FIG. 10 in about the folded position of FIG. 11.
Figure 13:
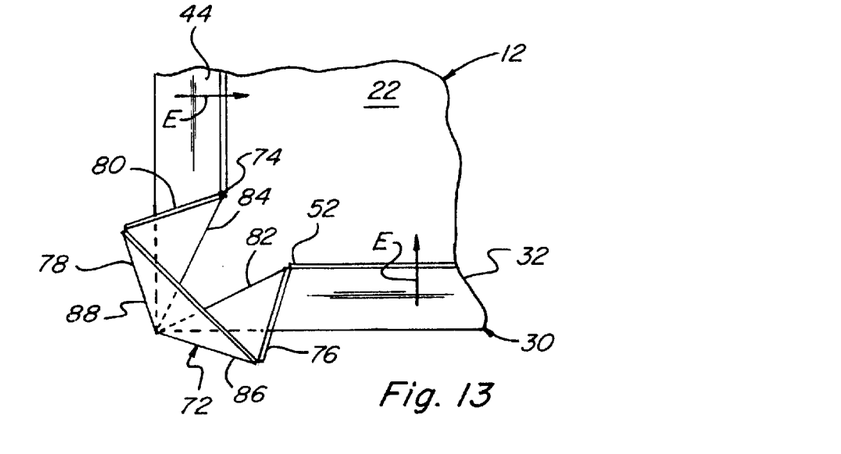
FIG. 13 is another simplified fragmentary top view of the extension and grain tank of FIG. 10 in a further folded position.
Figure 14:
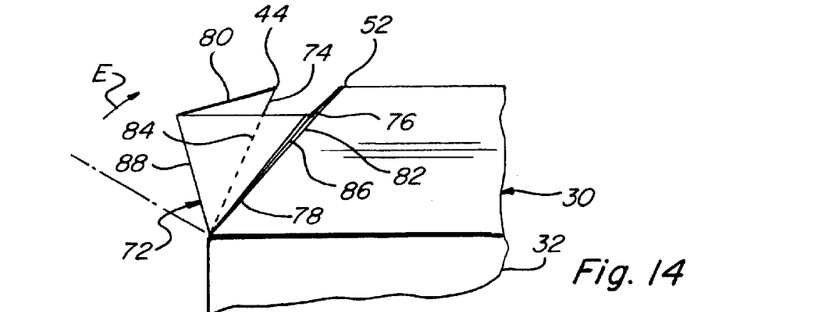
FIG. 14 is another simplified fragmentary front view of the extension and grain tank of FIG. 10 shown about the folded position of FIG. 13.

Referring more particularly to FIGS. 11 and 12, the folding of extension 30 including representative foldable corner panel 72 from the deployed or unfolded position is initiated by substantially simultaneous pivotal movement of panels 32 and 44 upwardly and inwardly toward receptacle 22, as denoted by arrows D, which causes sections 76 and 80 to pivot outwardly in their only folding direction away from receptacle 22. In FIGS. 13 and 14, further pivotal movement of panels 32 and 44, denoted by arrows E, causes further hinged or pivotal movement of panels 76 and 80 outwardly from receptacle 22.

Figure 15:
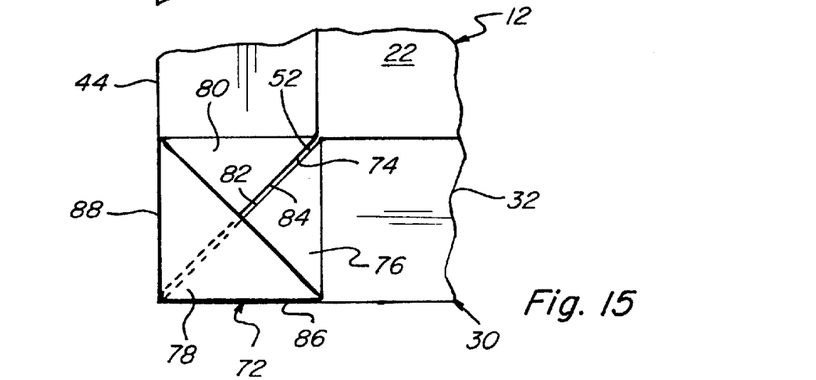
FIG. 15 is a simplified fragmentary top view of the extension and grain tank of FIG. 10 in a fully folded position.

In FIG. 15, panels 32 and 44 are shown in their fully folded or closed positions in partial covering relation to receptacle 22, sections 76 and 80 overlaying panels 32 and 44, respectively, and section 78 overlaying an outer portion of sections 76 and 80.

Here, it should be noted that extension panels 32, 38, 42, and 44, and corner panels 50 and 72 are shown in the above embodiments oriented at about a 30° angle to horizontal when in the deployed position. A value such as this for this angle is preferred over a significantly greater value, as the lower angle provides a greater grain holding capacity for a given height, as long as the angle is not so flat as to allow significant amounts of grain to fall over the edges of the extension, particularly when machine 10 is travelling over hillsides and grades anticipated to be encountered in a particular application. In this regard, an angle relative to horizontal of between about 20° and about 60° will be suitable for many applications, an angle of between about 20° and 40° being most preferred.

It should also be understood that it is desired for the extensions of the invention to be completely operable, that is, movable between their folded position and their deployed position, remotely, and/or automatically, using suitable actuators, hand cranks, or the like, such that an operator is not required to climb to the top of machine 10 to manually operate or unfold any portion of the extension.

It will be further understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiments of the invention; however, concepts, as based upon the description, may be employed in other embodiments without departing from the scope of the invention. Accordingly, the following claims are intended to protect the invention broadly as well as in the specific form shown.

What is claimed is:

1. A foldable extension for increasing a grain holding capacity of a grain tank of an agricultural harvesting machine, the grain tank including angularly related upper peripheral portions defining an upwardly facing opening, the extension comprising:

a plurality of extension panels mounted for pivotal movement about the upper peripheral portions of the grain tank, respectively, each of the extension panels being pivotally positionable in a deployed position extending upwardly and outwardly relative to the opening of the grain tank at an acute angle of less than about 80° to horizontal, and a generally horizontal folded position extending over a portion of the opening, adjacent ones of the extension panels having adjacent ends defining corner spaces therebetween when in the deployed position; and foldable corner panels connected between the adjacent ends of the adjacent ones of the extension panels, respectively, so as to be foldable by the pivotal movement of the extension panels between the deployed and folded positions, each of the corner panels including hinge joints hingedly connecting the corner panel to the adjacent ends and additional hinge joints dividing the corner panel into sections hingedly movable in predetermined directions between predetermined positions about the hinge joints, such that when the extension panels are pivotally moved to the deployed position the sections will be hingedly moved into a generally side-by-side predetermined relation extending upwardly and outwardly from the opening of the grain tank, and such that when the extension panels are pivotally moved to the folded position the sections will be hingedly folded so as to be at least generally horizontal and in overlaying relation one relative to another.

2. The foldable extension of claim 1, wherein the hinge joints of each of the corner panels are positioned and oriented and allow predetermined hinged movement of the sections of the corner panel in directions such that the sections will hingedly fold in a predetermined order as the adjacent extension panels are being pivoted to the folded position such that the sections will be positioned between the adjacent extension panels when in the folded position.

3. The foldable extension of claim 2, wherein the sections include a first section hingedly connected to a first of the adjacent extension panels and a second section hingedly connected to the first section, the first and second sections being hingedly movable outwardly as the first of the adjacent extension panels is pivoted inwardly from the deployed position, and the sections include a third section hingedly connected to the second section and to a second of the adjacent extension panels so as to hingedly move inwardly as the first of the adjacent extension panels is pivoted inwardly from the deployed position, such that the adjacent end of the second extension panel will overlay the third section and the third section will overlay the first and second sections and the adjacent end of the first extension panel when the extension panels are pivoted to the folded position.

4. The foldable extension of claim 1, wherein the foldable corner panels are positioned and oriented and allow predetermined hinged movement of the sections thereof as the adjacent extension panels are being pivoted from the deployed position inwardly to the folded position such that the sections will be located in a generally horizontal position in overlaying relation to the adjacent ends of the adjacent extension panels when in the folded position.

5. The foldable extension of claim 4, wherein the sections of the corner panels include two sections hingedly connected to the adjacent ends of the adjacent extension panels, respectively, and a section disposed between and hingedly connected to the two sections, such that when the adjacent extension panels are simultaneously pivotally moved from the deployed position toward the folded position the two sections will hingedly move outwardly such that the adjacent ends of the extension panels can pass therebeneath and the section disposed between and hingedly connected to the two sections will hingedly move into overlaying relation to portions of the two sections and the adjacent ends when the extension panels are pivoted to the folded position.

6. The foldable extension of claim 1, wherein the extension panels extend upwardly and outwardly away from the opening at an angle of between about 20° and about 40° relative to horizontal when in the deployed position.

7. A grain tank for an agricultural harvesting machine, comprising:

a plurality of angularly related upstanding walls extending around and defining a receptacle for receiving crop material harvested by the machine, each of the walls having an upper edge, adjacent ones of the upper edges being angularly related one to the other and the upper edges extending at least substantially around and defining an upwardly facing opening having a predetermined horizontal extent communicating with the receptacle;

a plurality of substantially rigid extension panels supported along the upper edges of the walls, respectively, for pivotal movement relative to the walls between a first position oriented at least generally horizontally and extending at least partially over the opening, and a second position extending upwardly and outwardly away from the opening at an angle of less than about 80° relative to horizontal, adjacent ones of the extension panels having spaced opposed ends defining corner gaps therebetween when the extension panels are in the second position; and a plurality of foldable corner panels connected between the ends of the adjacent ones of the extension panels, respectively, each of the corner panels including at least four hinge joints at predetermined locations between the adjacent ones of the extension panels dividing the corner panel into at least three sections, such that when the extension panels are moved into the first position thereof the sections will be moved into at least generally overlaying relation one relative to another, and when the extension panels are moved into the second position the sections will be moved into side-by-side relation extending upwardly and outwardly away from the opening of the grain tank at an angle to horizontal about equal to the angle of the extension panels.

8. The grain tank of claim 7, wherein the sections of each of the foldable corner panels are folded in overlaying relation to the ends of the adjacent extension panels when in the first position.

9. The grain tank of claim 7, wherein the sections of each of the foldable corner panels are folded in overlaying relation between the ends of the adjacent extension panels when in the first position.

10. The grain tank of claim 7, wherein the extension panels extend upwardly and outwardly away from the opening at an angle of between about 20° and about 40° relative to horizontal when in the second position.

11. A foldable extension for increasing a grain holding capacity of a grain tank of an agricultural harvesting machine, the grain tank including four angularly related upper peripheral portions defining an upwardly facing rectangular opening, the foldable extension comprising:

a first substantially rigid extension panel mounted for pivotal movement about a first one of the upper peripheral portions of the grain tank;

a second substantially rigid extension panel mounted for pivotal movement about a second one of the upper peripheral portions of the grain tank;

a third substantially rigid extension panel mounted for pivotal movement about a third one of the upper peripheral portions of the grain tank;

a fourth substantially rigid extension panel mounted for pivotal movement about a fourth one of the upper peripheral portions of the grain tank, the extension panels each being pivotally movable between a first position extending upwardly and outwardly relative to the opening of the grain tank at an acute angle to horizontal of between about 20° and about 60°, and a second position extending generally horizontally over a portion of the opening, adjacent ones of the extension panels having spaced opposed ends defining gaps therebetween when the extension panels are in the first position; and foldable corner panels connected between the spaced opposed ends of the adjacent ones of the extension panels enclosing the gaps therebetween, respectively, each of the foldable corner panels including three substantially rigid sections joined together by hinge joints which allow foldable movement of the sections in predetermined directions such that the sections will fold into a predetermined overlaying relation one relative to another when the extension panels are pivotally moved to the second position.

12. The foldable extension of claim 11, wherein the sections will be located in a predetermined at least generally horizontal overlaying relation one relative to another above the ends of the adjacent extension panels when in the second position.

13. The foldable extension of claim 11, wherein the sections will be located in a predetermined at least generally horizontal overlaying relation one relative to another between the ends of the adjacent extension panels when in the second position.

* * * * *